US012564986B2

(12) United States Patent
Yoshida et al.

(10) Patent No.: US 12,564,986 B2
(45) Date of Patent: Mar. 3, 2026

(54) COMPRESSION MOLDING DIE, RESIN MOLDING DEVICE, RESIN MOLDING SYSTEM, AND METHOD FOR MANUFACTURING RESIN MOLDED PRODUCT

(71) Applicant: TOWA CORPORATION, Kyoto (JP)

(72) Inventors: Yusuke Yoshida, Kyoto (JP); Kunihiko Fujiwara, Kyoto (JP); Kosuke Hayashi, Kyoto (JP)

(73) Assignee: TOWA CORPORATION, Kyoto (JP)

( * ) Notice: Subject to any disclaimer, the term of this patent is extended or adjusted under 35 U.S.C. 154(b) by 142 days.

(21) Appl. No.: 18/564,206

(22) PCT Filed: Feb. 3, 2022

(86) PCT No.: PCT/JP2022/004302
§ 371 (c)(1),
(2) Date: Nov. 27, 2023

(87) PCT Pub. No.: WO2022/259604
PCT Pub. Date: Dec. 15, 2022

(65) Prior Publication Data
US 2024/0246265 A1      Jul. 25, 2024

(30) Foreign Application Priority Data
Jun. 8, 2021     (JP) ................................. 2021-095697

(51) Int. Cl.
B29C 33/72      (2006.01)
B29C 43/18      (2006.01)
B29C 43/36      (2006.01)

(52) U.S. Cl.
CPC .............. *B29C 33/72* (2013.01); *B29C 43/18* (2013.01); *B29C 43/3607* (2013.01); *B29C 2033/727* (2013.01)

(58) Field of Classification Search
None
See application file for complete search history.

(56) References Cited

FOREIGN PATENT DOCUMENTS

| EP | 3072660 A1 | 9/2016 |
| JP | 2005-305951 A | 11/2005 |
| JP | 2012-187832 A | 10/2012 |
| JP | 2015-228450 A | 12/2015 |
| JP | 2019-010887 A | 1/2019 |

(Continued)

OTHER PUBLICATIONS

Ko JP2015228450A 2015 english translation (Year: 2015).*

(Continued)

*Primary Examiner* — Jacob T Minskey
*Assistant Examiner* — Adrien J Bernard
(74) *Attorney, Agent, or Firm* — Faegre Drinker Biddle & Reath LLP

(57) ABSTRACT

A compression molding die includes a first mold and a second mold. The first mold includes a bottom surface member and a side surface member. A space is providable in the first mold by a step of at least one of an outer peripheral surface of the bottom surface member and an inner peripheral surface of the side surface member. The first mold includes a gas inlet capable of introducing gas into the space, a gas outlet through which the gas introduced into the space is dischargeable, and a seal member below the space.

12 Claims, 12 Drawing Sheets

(56)  References Cited

FOREIGN PATENT DOCUMENTS

| JP | 2020-032687 A | 3/2020 |
| TW | 2020-10620 A | 3/2020 |

OTHER PUBLICATIONS

Takada JP2020032687A 2020 english translation (Year: 2020).*
Kadoriku JP2012187832A English Translation 2012 (Year: 2012).*
Nakazawa JP2019010887A English Translation 2019 (Year: 2019).*
Extended European Search Report issued on Mar. 25, 2025 in corresponding European patent application 22819795.0.
Office Action mailed Jan. 4, 2023 for counterpart Taiwanese Patent Application No. 111113043.

* cited by examiner

COMPRESSION MOLDING DIE, RESIN MOLDING DEVICE, RESIN MOLDING SYSTEM, AND METHOD FOR MANUFACTURING RESIN MOLDED PRODUCT

TECHNICAL FIELD

The present disclosure relates to a compression molding die, a resin molding device, a resin molding system, and a method for manufacturing a resin molded product.

BACKGROUND ART

Hitherto, electronic components such as a semiconductor chip mounted on a substrate have been resin-sealed by performing compressing and molding with use of a resin molding device including a compression molding die formed by both of upper and lower molds.

For example, PTL 1 discloses a resin sealing method for a product to be molded. The resin sealing method seals the product to be molded with resin in molds that face each other. The resin sealing method includes a first procedure of separating a part of the product to be molded that is not resin-sealed from the molds and obtaining a state in which only the resin is in contact with a specific mold out of the molds, and a second procedure of waiting for the resin to mold-shrink in this state.

CITATION LIST

Patent Literature

PTL 1: Japanese Patent Laying-Open No. 2005-305951

SUMMARY OF INVENTION

Technical Problem

According to the resin sealing method described in PTL 1, there is no need to use a mold releasing film for separating the product to be molded from the molds.

However, in the resin sealing method described in PTL 1, there have been cases where resin that has been heated and melted gets into a place between a frame-like mold of the lower mold and a compression mold when the compression mold slides with respect to the frame-like mold of the lower mold at the time of compression and molding of the product to be molded by the upper mold and the lower mold. This is caused by the following reason. Specifically, the compression mold slides upward with respect to the frame-like mold at the time of resin sealing of the product to be molded, but resin adhering to an inner peripheral surface of the frame-like mold that is exposed is drawn into a gap between the frame-like mold and the compression mold when the compression mold slides upward with respect to the frame-like mold. When resin gets into a place between the frame-like mold and the compression mold as above, there have been problems as described below.

Specifically, the resin drawn into the gap between the frame-like mold and the compression mold falls off in the molds and is accumulated as a resin residue. Therefore, there has been a need to frequently disassemble and clean the molds. Liquid resin that has not fallen off returns to a place on the molds and has caused a resin residue, which causes uncleanliness of the molds, and caused defective products by getting into the resin molded product. There has also been a problem in that the wear of the molds progresses at the time of sliding of the compression mold with respect to the frame-like mold, thereby causing the lifespan of those molds to be shorter.

Solution to Problem

According to the embodiment disclosed herein, it is possible to provide a compression molding die including: a first mold; and a second mold disposed above the first mold to face the first mold. In the compression molding die, the first mold includes a bottom surface member and a side surface member, the bottom surface member includes an upper surface on which a resin material can be disposed, and an outer peripheral surface that extends downward from the upper surface, the side surface member includes an inner peripheral surface that surrounds the outer peripheral surface of the bottom surface member, a cavity of the first mold is formed by at least the upper surface of the bottom surface member and the inner peripheral surface of the side surface member, a space is providable in the first mold by a step in at least one of the outer peripheral surface of the bottom surface member and the inner peripheral surface of the side surface member, and the first mold further includes a gas inlet through which gas is introducible into the space, a gas outlet through which the gas introduced into the space is dischargeable, and a seal member below the space.

According to the embodiment disclosed herein, it is possible to provide the resin molding device including the compression molding die.

According to the embodiment disclosed herein, it is possible to provide the resin molding system including the resin molding device.

According to the embodiment disclosed herein, it is possible to provide a method for manufacturing a resin molded product using the compression molding die. The method includes: installing a molding target into the second mold; supplying a resin material into the cavity; manufacturing a resin molded product by resin-molding the molding target with use of the resin material; and introducing gas into the space from the gas inlet and discharging the gas from the gas outlet.

According to the embodiment disclosed herein, it is possible to provide a method for manufacturing a resin molded product. The method includes preparing a compression molding die including: a first mold; and a second mold disposed above the first mold to face the first mold. In the method, the first mold includes a bottom surface member, a side surface member, a cavity formed by the bottom surface member and the side surface member, a space below the cavity, a gas inlet through which gas is introducible into the space, and a gas outlet through which the gas introduced into the space is dischargeable. The method for manufacturing a resin molded product further includes: installing a molding target into the second mold; supplying a resin material into the cavity; moving the first mold toward the second mold; moving the bottom surface member toward the second mold; manufacturing a resin molded product by resin-molding a molding target with use of the resin material; and introducing gas into a space from the gas inlet and discharging the gas from the gas outlet. The moving the bottom surface member includes moving the bottom surface member while reducing a volume of the space.

Advantageous Effects of Invention

According to the embodiment disclosed herein, it is possible to provide the compression molding die, the resin molding device, the resin molding system, and the method for manufacturing a resin molded product capable of extending the lifespan of the mold, reducing the amount of the resin residue that causes uncleanliness of the mold and the amount of resin that gets into the resin molded product, suppressing the falling of the resin residue to the lower portion of the mold, and reducing the number of times the mold is disassembled and cleaned.

DESCRIPTION OF EMBODIMENTS

Figure 1:
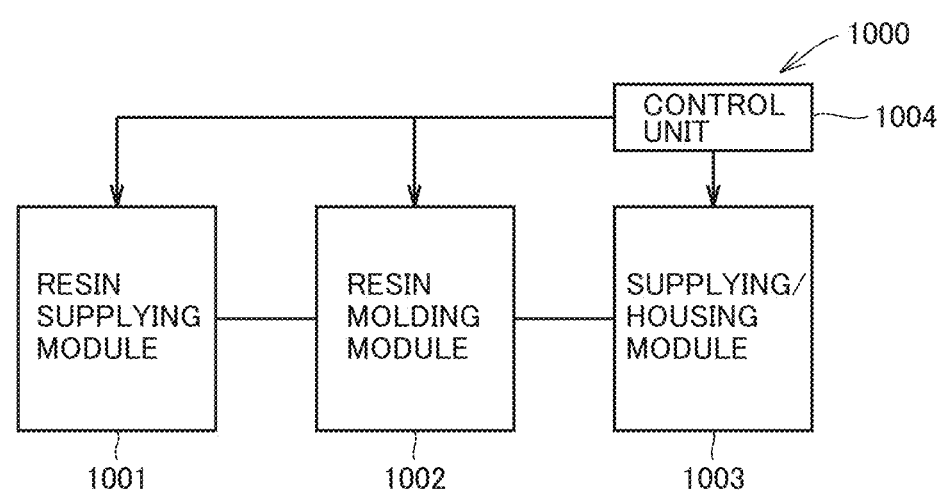
FIG. 1 is a functional block diagram of one example of a resin molding system of an embodiment.

Embodiments are described below. In the drawings used in the description of the embodiments, the same reference characters represent the same parts or equivalent parts.

<Resin Molding System>

FIG. 1 shows a functional block diagram of one example of a resin molding system of an embodiment. A resin molding system 1000 shown in FIG. 1 includes a resin supplying module 1001 capable of supplying a resin material, a resin molding module 1002 capable of manufacturing a resin molded product by compressing and molding an object to be molded, a supplying/housing module 1003 capable of supplying a molding target before molding and housing therein a resin molded product after compressing and molding, and a control unit 1004. Control unit 1004 is configured to be able to control resin supplying module 1001, resin molding module 1002, and supplying/housing module 1003.

Resin supplying module 1001, resin molding module 1002, and supplying/housing module 1003 are attachable to and removable from each other and are replaceable with each other.

Resin supplying module 1001 includes a resin material supplying device capable of supplying a resin material to resin molding module 1002.

Resin molding module 1002 includes a resin molding device of the embodiment. Details of the resin molding device of the embodiment are described below. Resin molding module 1002 may be provided by a plurality of numbers.

Supplying/housing module 1003 includes a supplying device capable of supplying a molding target before being resin-molded, and a housing device capable of housing therein a resin molded product after compressing and molding.

The resin molded product compressed and resin-molded by the resin molding device is housed in supplying/housing module 1003.

<Resin Molding Device>

Figure 2:
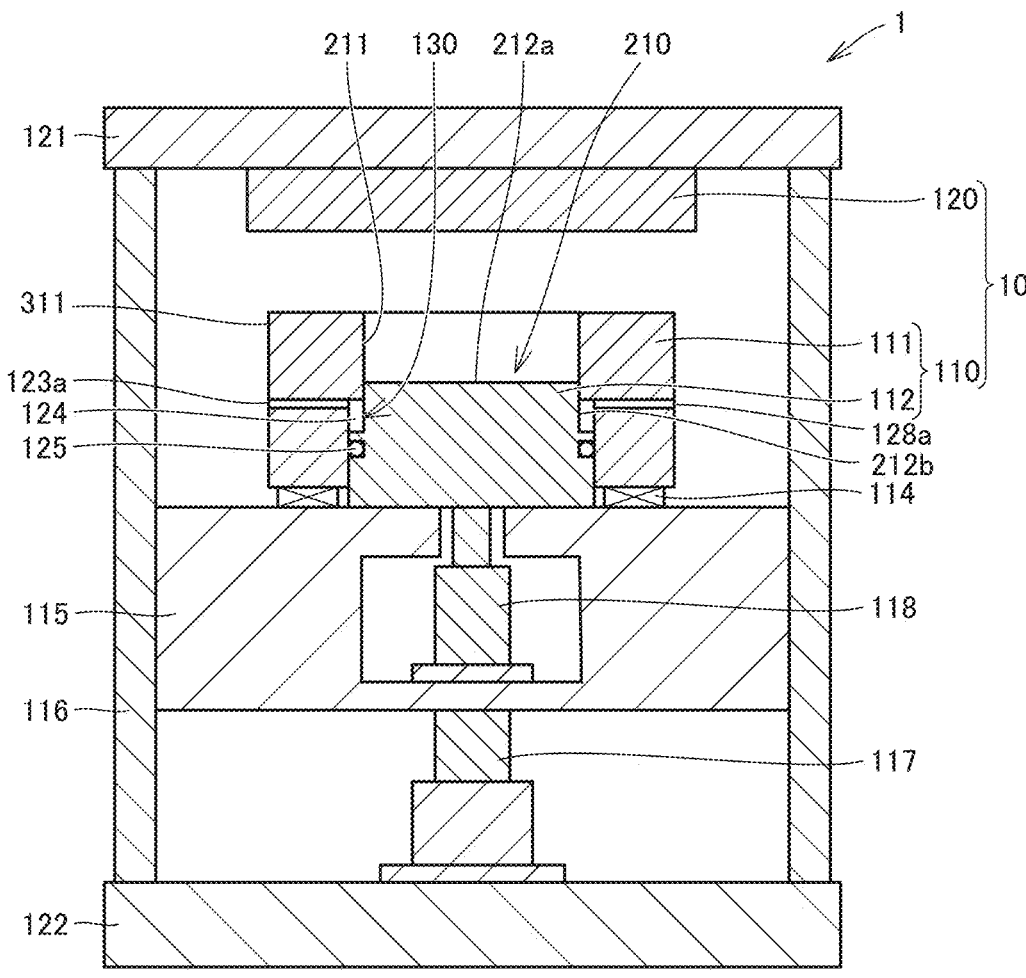
FIG. 2 is a schematic cross-sectional view of a resin molding device that is one example of a resin molding device of the embodiment.

FIG. 2 shows a schematic cross-sectional view of a resin molding device 1 that is one example of a resin molding device of the embodiment. As shown in FIG. 2, resin molding device 1 of the embodiment includes a compression molding die 10. Compression molding die 10 includes a first mold 110, and a second mold 120 disposed above first mold 110 to face first mold 110.

First mold 110 includes a side surface member 111, and a bottom surface member 112. Bottom surface member 112 includes an upper surface 212a on which the resin material can be disposed, and an outer peripheral surface 212b that extends downward from upper surface 212a of bottom surface member 112. Side surface member 111 includes an inner peripheral surface 211 that surrounds outer peripheral surface 212b of bottom surface member 112, and outer peripheral surface 311 that configures an external form of side surface member 111. First mold 110 includes a cavity 210. Cavity 210 is formed by upper surface 212a of bottom surface member 112, and inner peripheral surface 211 of side surface member 111.

First die 110 is configured such that a space 124 can be provided below cavity 210 by a step 130 in at least one of outer peripheral surface 212b of bottom surface member 112 and inner peripheral surface 211 of side surface member 111.

First mold 110 further includes a gas inlet 123a through which gas is introducible into space 124, a gas outlet 128a through which the gas introduced into space 124 is dischargeable, and a seal member 125 between outer peripheral surface 212b of bottom surface member 112 and inner peripheral surface 211 of side surface member 111 below space 124.

Resin molding device 1 further includes an upper stationary platen 121, a lower stationary platen 122, and a movable platen 115. A plurality of supporting portions 116 extend between upper stationary platen 121 and lower stationary platen 122 in a vertical direction. Each of plurality of supporting portions 116 has one end fixed to upper stationary platen 121 and another end fixed to lower stationary platen 122. An elastic member 114 is provided between side surface member 111 and movable platen 115.

Resin molding device 1 further includes a first driving mechanism 117 between plurality of supporting portions 116 in lower stationary platen 122. First driving mechanism 117 can move movable platen 115 upward and downward. Upper stationary platen 121 and lower stationary platen 122 are fixed and are unmovable. Therefore, movable platen 115 can relatively move with respect to upper stationary platen 121 and lower stationary platen 122. First driving mechanism 117 can move side surface member 111 and bottom surface member 112 upward and downward, in other words, lift and lower side surface member 111 and bottom surface member 112 via movable platen 115.

Resin molding device 1 further includes a second driving mechanism 118 on the inside of movable platen 115. Second driving mechanism 118 can move bottom surface member 112 upward and downward, in other words, lift and lower bottom surface member 112. As a result, bottom surface member 112 can relatively move with respect to side surface member 111.

Figure 3:
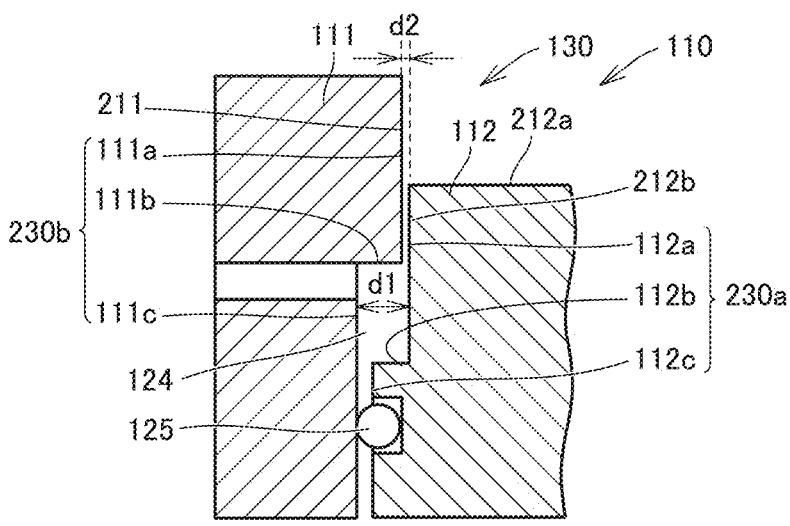
FIG. 3 is a schematic enlarged cross-sectional view of a first mold of the resin molding device of the embodiment.

FIG. 3 shows a schematic enlarged cross-sectional view of first mold 110 of resin molding device 1 of the embodiment. As shown in FIG. 3, step 130 in first mold 110 includes a first step 230a in outer peripheral surface 212b of bottom surface member 112, and a second step 230b in inner peripheral surface 211 of side surface member 111. First step 230a in bottom surface member 112 includes a first outer peripheral surface 112a that extends downward from an outer end of upper surface 212a of bottom surface member 112, a second outer peripheral surface 112b that extends from a lower end of first outer peripheral surface 112a to the outer side (the direction of separating from bottom surface member 112), and a third outer peripheral surface 112c that extends downward from an outer end of second outer peripheral surface 112b. Second step 230b in side surface member 111 includes a first inner peripheral surface 111a slidable with first outer peripheral surface 112a of bottom surface member 112, a second inner peripheral surface 111b that extends from a lower end of first inner peripheral surface 111a to the outer side, and a third inner peripheral surface 111c that extends downward from an outer end of second inner peripheral surface 111b.

As shown in FIG. 3, space 124 is surrounded by first outer peripheral surface 112a and second outer peripheral surface 112b of bottom surface member 112, and second inner peripheral surface 111b and third inner peripheral surface 111c of side surface member 111. A surface of second outer peripheral surface 112b of bottom surface member 112 is formed below first outer peripheral surface 112a of bottom surface member 112 and first inner peripheral surface 111a of side surface member 111 that slide.

A width d1 of space 124 is wider than a width d2 between first outer peripheral surface 112a of bottom surface member 112 and first inner peripheral surface 111a of side surface member 111. For example, width d1 of space 124 can be twice or more and 1000 times or less and preferably about 500 times of width d2 between first outer peripheral surface 112a of bottom surface member 112 and first inner peripheral surface 111a of side surface member 111. When width d1 of space 124 is set to be wider than width d2 with respect to first inner peripheral surface 111a of side surface member 111, in particular, when width d1 of space 124 is set to be twice or more and 1000 times or less of width d2 with respect to first inner peripheral surface 111a of side surface member 111, a resin residue is easily accumulated in space 124, and the flow of gas such as compressed air introduced into space 124 from gas inlet 123a can be improved. Width d1 of space 124 can be set to about 5 mm, for example, width d2 of the gap between first outer peripheral surface 112a of bottom surface member 112 and first inner peripheral surface 111a of side surface member 111 can be set to be 5 μm to 20 μm, for example.

As shown in FIG. 3, compression molding die 10 further includes seal member 125 between third outer peripheral surface 112c of bottom surface member 112 and third inner peripheral surface 111c of side surface member 111 below space 124. As a result, the resin residue that has fallen below from space 124 without being discharged from gas outlet 128a as a result of introducing gas into space 124 from gas inlet 123a can be stopped by seal member 125. Therefore, it becomes possible to suppress the intrusion of the resin residue to a lower portion of first mold 110 by seal member 125. As seal member 125, a consumable material such as a packing, for example, can be used.

Figure 4:
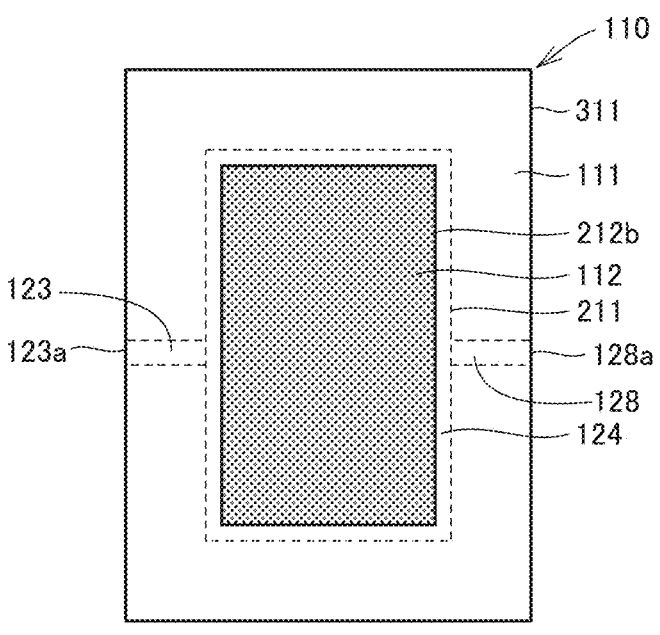
FIG. 4 is a schematic plan view of the first mold of the resin molding device of the embodiment.

FIG. 4 shows a schematic plan view of first mold 110 of resin molding device 1 of the embodiment. As shown in FIG. 4, gas inlet 123a and gas outlet 128a are provided in outer peripheral surface 311 of side surface member 111. Space 124 is formed in an annular shape that surrounds outer peripheral surface 212b of bottom surface member 112 between inner peripheral surface 211 of side surface member 111 and outer peripheral surface 212b of bottom surface member 112. Gas inlet 123a is connected to space 124 via a gas introducing passage 123 provided in side surface member 111, and space 124 is connected to gas outlet 128a via a gas discharging passage 128 provided in side surface member 111. As a result, the gas introduced from gas inlet 123a is discharged from gas outlet 128a through gas introducing passage 123, space 124, and gas discharging passage 128.

In this embodiment, one gas inlet 123a and one gas outlet 128a are provided in outer peripheral surface 311 of side surface member 111, but plurality of gas inlets 123*a* may be provided and plurality of gas outlets 128*a* may be provided.

<Method for Manufacturing Resin Molded Product>

With reference to schematic cross-sectional views of FIG. 5 to FIG. 11, one example of a method for manufacturing a resin molded product of the embodiment is described below. First, with reference to FIG. 5, a process of preparing compression molding die 10 is performed. The process of preparing compression molding die 10 can be performed by installing first mold 110 on movable platen 115 and installing second mold 120 on upper stationary platen 121, for example.

Figure 5:
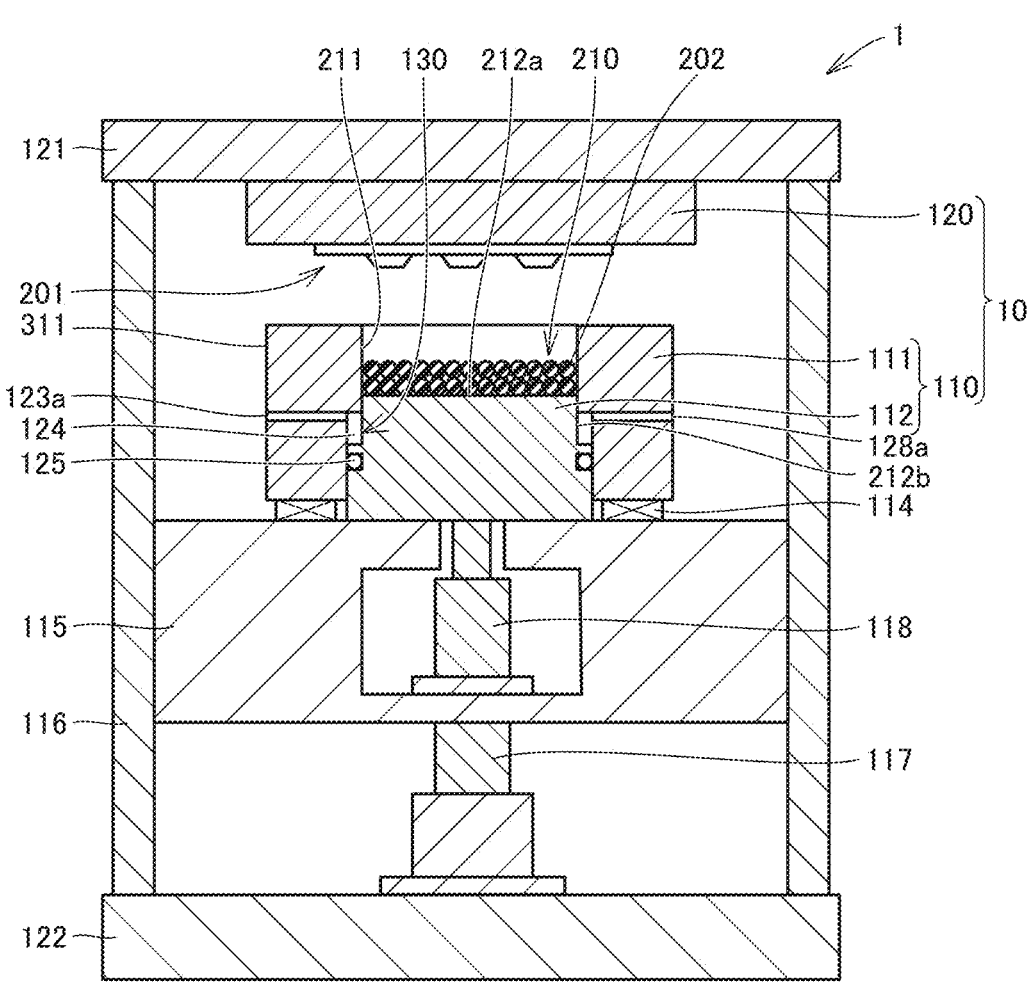
FIG. 5 is a schematic cross-sectional view for describing a part of a process of one example of a method for manufacturing a resin molded product of the embodiment.

Next, as shown in FIG. 5, a process of installing a molding target 201 in second mold 120 is performed. The process of installing molding target 201 in second mold 120 can be performed by holding molding target 201 on second mold 120 in an adsorbing manner, for example. Molding target 201 is a lead frame, a substrate, a semiconductor substrate (a silicon wafer and the like), a metal substrate, a glass substrate, a ceramic substrate, or a wiring substrate, for example.

Next, as shown in FIG. 5, a process of supplying a resin material 202 into cavity 210 of first mold 110 is performed.

Figure 6:
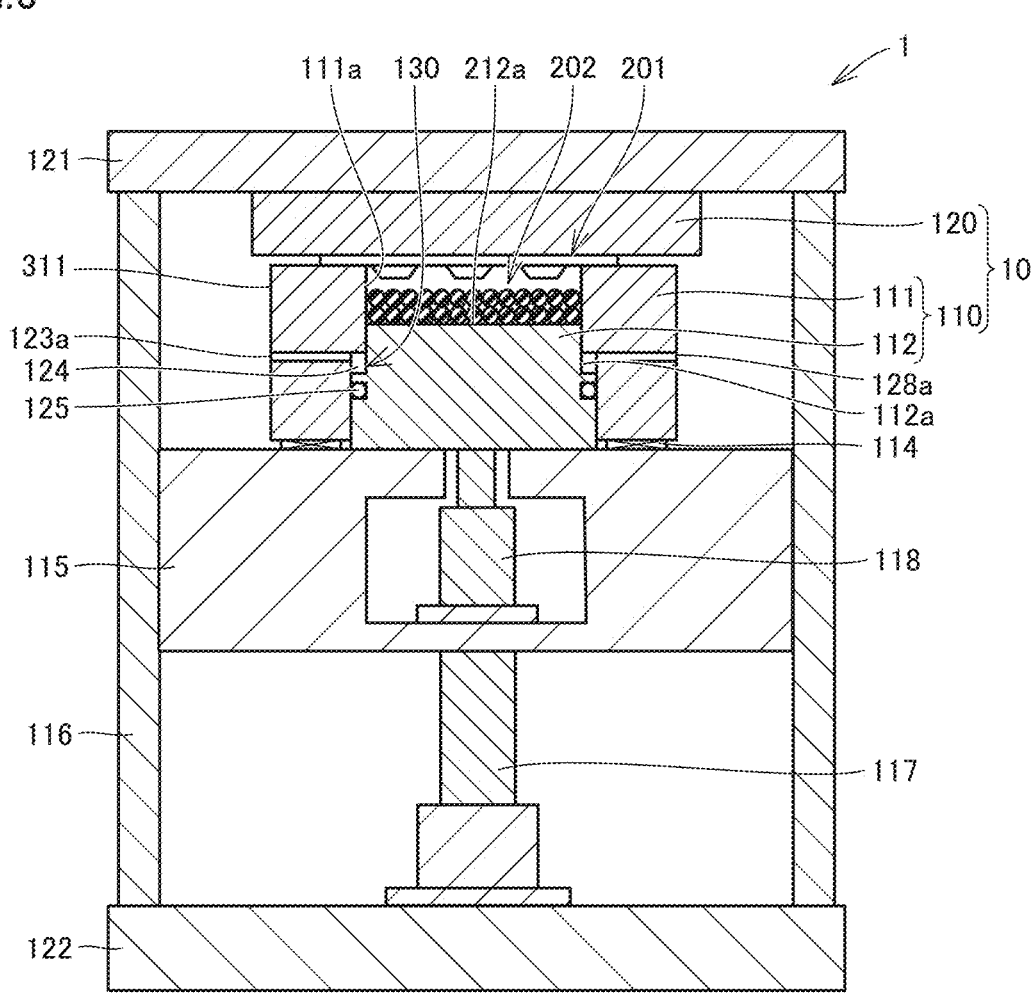
FIG. 6 is a schematic cross-sectional view for describing another part of the process of one example of the method for manufacturing a resin molded product of the embodiment.

Next, as shown in FIG. 6, a process of performing mold clamping by moving first mold 110 toward second mold 120 is performed. The process of moving first mold 110 toward second mold 120 can be performed by moving movable platen 115 in the direction of second mold 120 by first driving mechanism 117, for example.

Next, a process of manufacturing a resin molded product by resin-molding molding target 201 with use of resin material 202 is performed. The process of resin-molding molding target 201 with use of resin material 202 can be performed as below, for example.

Figure 7:
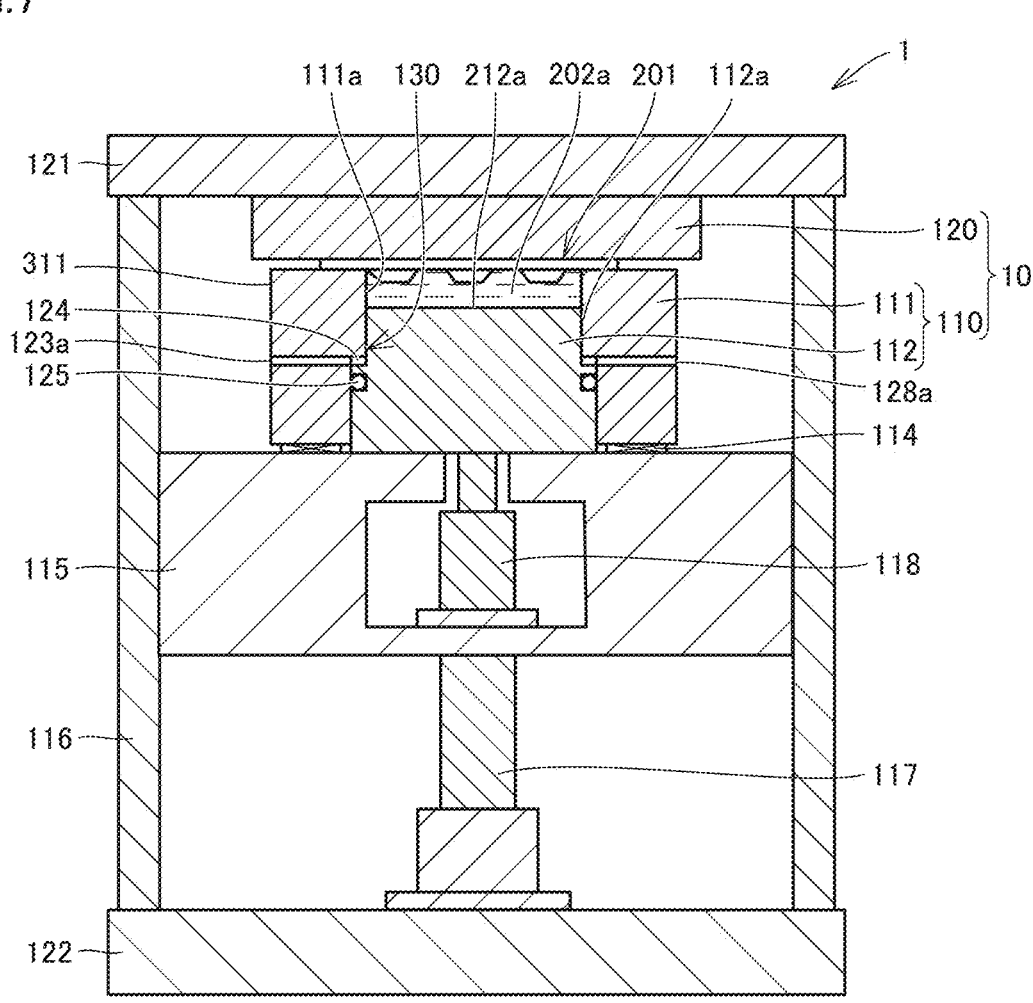
FIG. 7 is a schematic cross-sectional view for describing yet another part of the process of one example of the method for manufacturing a resin molded product of the embodiment.

First, as shown in FIG. 7, a process of obtaining a molten resin 202*a* by heating and melting resin material 202 and moving bottom surface member 112 toward second mold 120 is performed. The process of moving bottom surface member 112 toward second mold 120 can be performed by pushing an upper surface 112*a* of bottom surface member 112 upward by second driving mechanism 118, for example. Bottom surface member 112 relatively moves upward with respect to side surface member 111 while first outer peripheral surface 112*a* of bottom surface member 112 slides with respect to first inner peripheral surface 111*a* of side surface member 111, and the resin that has melted and adhered to first inner peripheral surface 111*a* of side surface member 111 is drawn into a sliding surface between first outer peripheral surface 112*a* of bottom surface member 112 and first inner peripheral surface 111*a* of side surface member 111. At this time, bottom surface member 112 moves toward second mold 120 while the distance between a second outer peripheral surface 112*b* of outer peripheral surface 212*b* of bottom surface member 112 and a second inner peripheral surface 111*b* of inner peripheral surface 211 of side surface member 111 is shrunk, in other words, the volume of space 124 is reduced.

Figure 8:
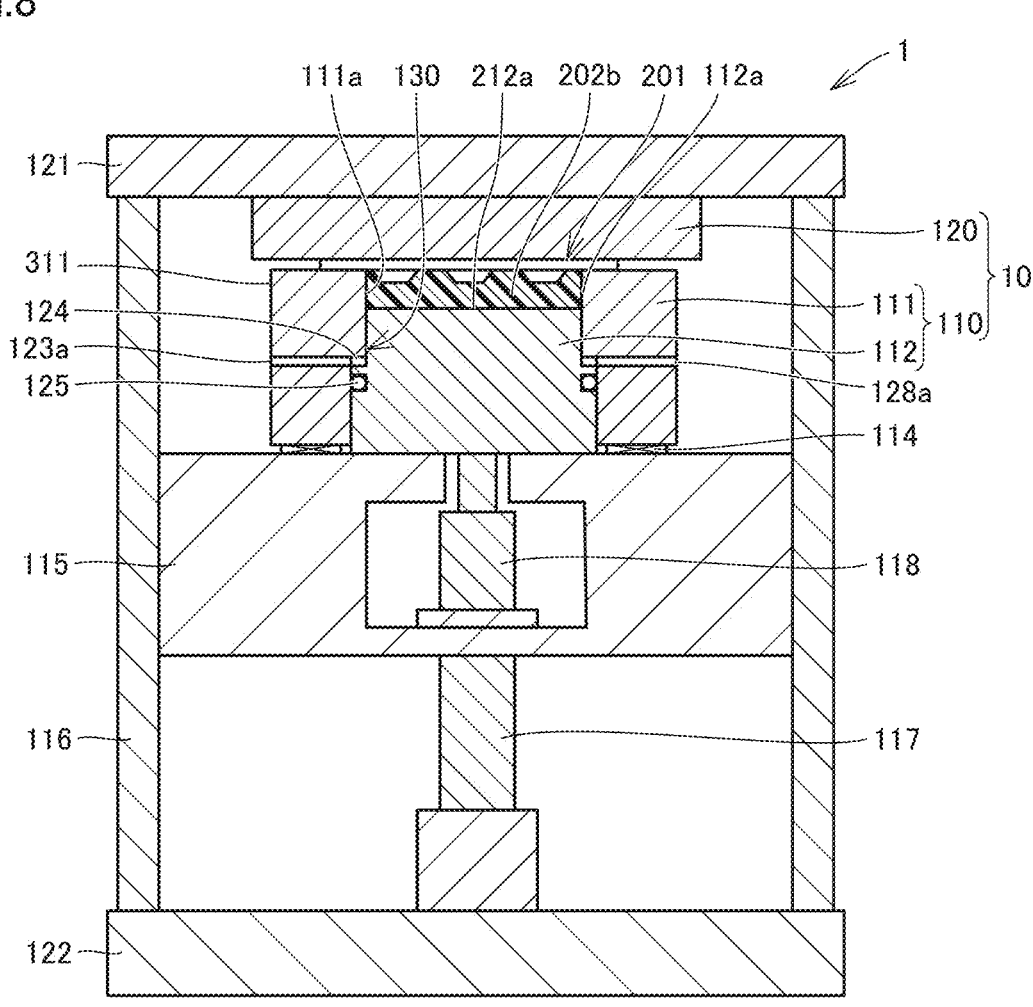
FIG. 8 is a schematic cross-sectional view for describing yet another part of the process of one example of the method for manufacturing a resin molded product of the embodiment.

Next, as shown in FIG. 8, molten resin 202*a* is further heated and cured in a state in which bottom surface member 112 is pushed upward, and a cured resin 202*b* is obtained. As a result, a resin molded product including cured resin 202*b* and molding target 201 covered with cured resin 202*b* can be manufactured.

Then, a mold opening process of compression molding die 10 is performed by causing movable platen 115 to descend by first driving mechanism 117, and the resin molded product is released from compression molding die

Figure 9:
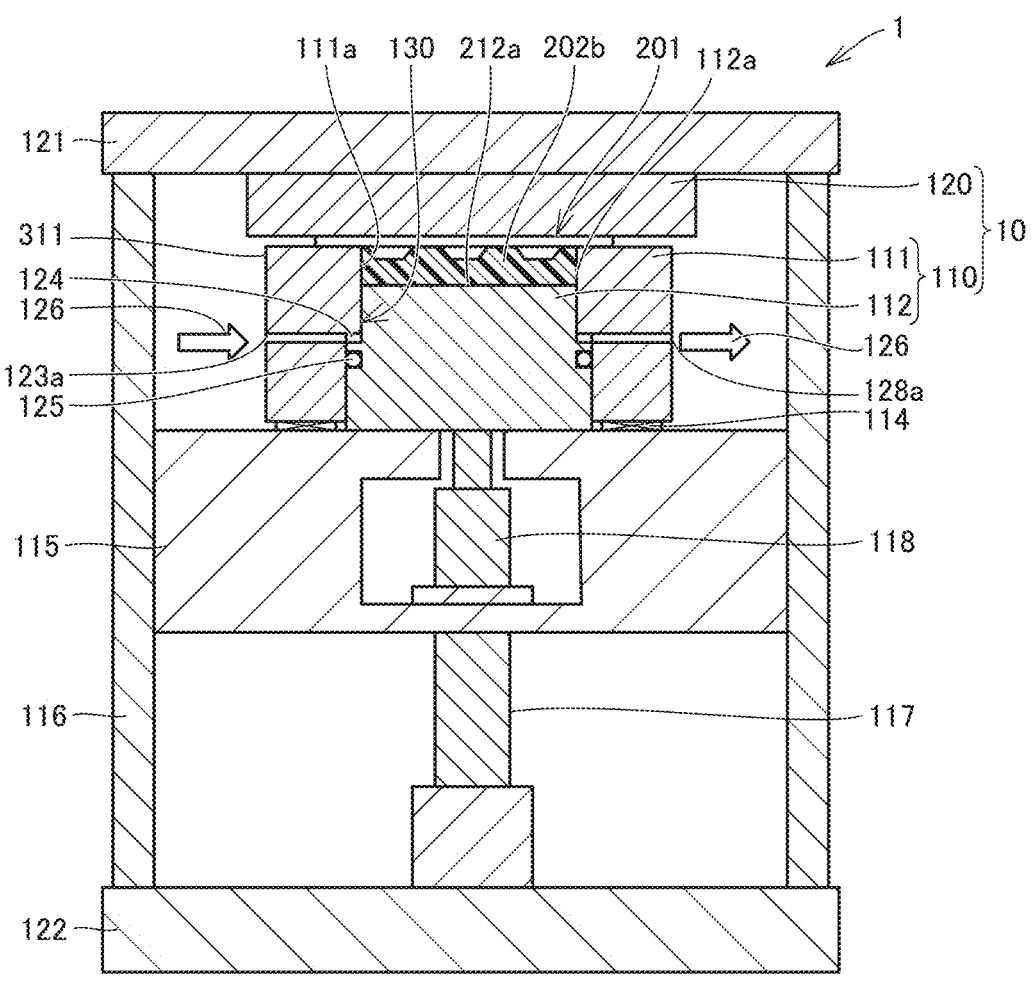
FIG. 9 is a schematic cross-sectional view for describing yet another part of the process of one example of the method for manufacturing a resin molded product of the embodiment.
Figure 10:
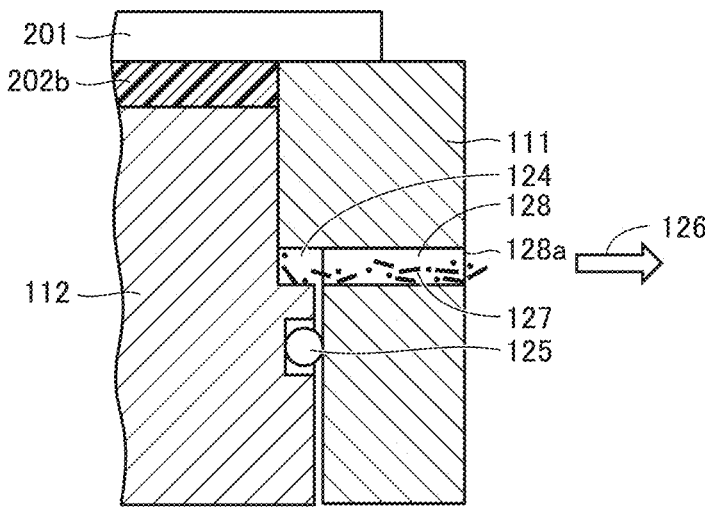
FIG. 10 is a schematic cross-sectional view for describing yet another part of the process of one example of the method for manufacturing a resin molded product of the embodiment.

10 and is removed from resin molding device 1 of the embodiment. At this time, a process of introducing gas into space 124 from gas inlet 123*a* and discharging the gas from gas outlet 128*a* is performed. This process can be performed by introducing gas such as compressed air from gas inlet 123*a* in the direction of an arrow 126, introducing the gas into space 124, and discharging the gas from gas outlet 128*a* as shown in FIG. 9, for example. At this time, first outer peripheral surface 112*a* of bottom surface member 112 slides with respect to first inner peripheral surface 111*a* of side surface member 111. As a result, even when resin that has gotten into a place between those surfaces falls and is accumulated in space 124 as a resin residue, a resin residue 127 can be removed from first mold 110 by being discharged from gas outlet 128*a* in the direction of arrow 126 with the gas introduced from gas inlet 123*a* as shown in FIG. 10, for example. At this time, the falling of a resin residue 124 that has been unable to be discharged from gas outlet 128*a* and fallen downward from space 124 is stopped by seal member 125. Therefore, a case where resin residue 124 falls to a place that is even lower of first mold 110 can be suppressed.

The process of introducing the gas into space 124 from gas inlet 123*a* and discharging the gas from gas outlet 128*a* may be performed anytime as long as the process is performed after the molten resin is cured, but is preferably performed immediately before the mold opening process (for example, immediately before curing time necessary for curing the resin ends (for example, one second before)) or at the same time as the mold opening process performed immediately after the curing time ends. As a result, the possibility of the resin residue moving to a molding surface of the resin molded product by the introduced gas after the resin molded product is released from compression molding die 10 by the mold opening process decreases. Therefore, a case where the resin residue gets into the resin molded product can be suppressed.

At the time of the mold opening process, the resin molded product may be released from compression molding die 10 by an ejector pin (not shown), as needed.

In the resin molding device of the related art, a cycle of installing the molding target into second mold 120, resin-molding the molding target, and carrying out the molding target excluding the process of introducing gas into space 124 from gas inlet 123*a* and discharging the gas from gas outlet 128*a* is set to be one cycle, and a plurality of resin molded products are manufactured by repeating this one cycle. In this embodiment, the process of introducing gas into space 124 from gas inlet 123*a* and discharging the gas from gas outlet 128*a* is performed once for one cycle, but does not necessarily need to be performed for each cycle, and may be performed at a rate of once for a plurality of cycles (for example, a rate of once for every five cycles or a rate of once for every ten cycles).

On the outer side of gas outlet 128*a* of outer peripheral surface 311 of side surface member 111, a resin residue collecting portion such as a dust filter may be provided, for example. In this case, by the process of introducing gas into space 124 from gas inlet 123*a* and discharging the gas from gas outlet 128*a*, it becomes possible to collect resin residue 127 that has gotten into the inside of first mold 110 into the resin residue collecting portion on the outer side of gas outlet 128*a* in outer peripheral surface 311 of side surface member 111. As a result, it becomes possible to discard resin residue 127 that has gotten into the inside of first mold 110 without scattering resin residue 127 to the outside of compression molding die 10. Therefore, a case where a defective product is generated due to resin residue 127 getting mixed into the resin molded product can be suppressed.

Figure 11:
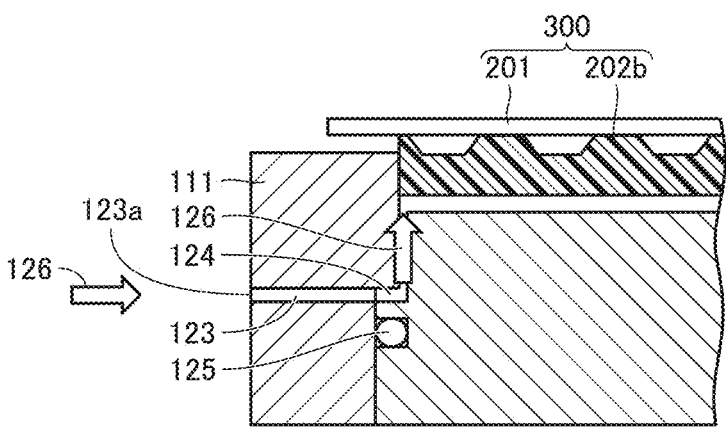
FIG. 11 is a schematic cross-sectional view for describing yet another part of the process of one example of the method for manufacturing a resin molded product of the embodiment.

A gas outlet closing process of closing gas outlet 128*a*, and a mold releasing process of releasing a resin molded product 300 from a first mold 100 while introducing gas into space 124 from gas inlet 123*a* after the gas outlet closing process can be further performed. According to the mold releasing process as above, as shown in FIG. 11, for example, the gas introduced into space 124 from gas inlet 123*a* may flow into a place between first inner peripheral surface 111*a* of side surface member 111 and first outer peripheral surface 112*a* of bottom surface member 112 and function as a force that assists the releasing of the resin molded product from first mold 100 to the upper side. Therefore, an effect of facilitating the releasing of the resin molded product from first mold 100 can be expected.

<Effects of Resin Molding Device of Embodiments>

In the resin molding device of the related art, an inner peripheral surface 1111*a* of a side surface member 1111 of a first mold 1100 shown in a schematic cross-sectional view of FIG. 12(*a*), for example, does not have space 124 below the cavity as that in resin molding device 1 of the embodiment and extends in the vertical direction (up-down direction). Therefore, in related-art first mold 1100 as above, there is resin 202*c* that comes into contact with inner peripheral surface 1111*a* of side surface member 1111 when resin material 202 is supplied.

Figure 12:
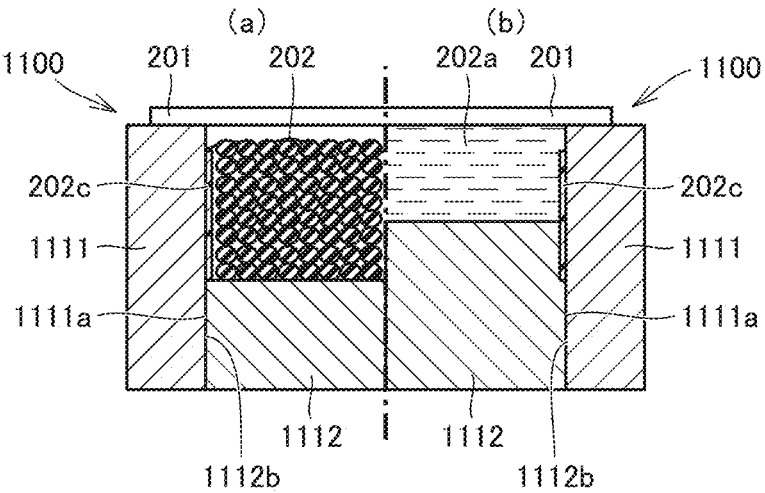
FIG. 12(a) is a schematic cross-sectional view of a first mold at the time of supply of a resin material of a resin molding device of the related art.
FIG. 12(b) is a schematic cross-sectional view of the first mold at the time of resin molding of the resin molding device of the related art.

Then, at the time of manufacturing of the resin molded product as shown in a schematic cross-sectional view of FIG. 12(*b*), for example, a sliding surface 1112*b* of a bottom surface member 1112 slides on resin 202*c* adhering to inner peripheral surface 1111*a* of side surface member 1111 and moves while drawing resin 202*c* into a place between inner peripheral surface 1111*a* of side surface member 1111 and sliding surface 1112*b* of bottom surface member 1112.

Therefore, in the resin molding device of the related art, resin 202*c* that has been drawn into a place between inner peripheral surface 1111*a* of side surface member 1111 and sliding surface 1112*b* of bottom surface member 1112 becomes a resin residue after curing and has caused uncleanliness of the mold or caused defective products by getting into the resin molded product.

Meanwhile, as shown in FIG. 2, for example, resin molding device 1 of the embodiment is configured to be able to provide space 124 by step 130 in at least one of outer peripheral surface 212*b* of bottom surface member 112 and inner peripheral surface 211 of side surface member 111, and includes gas inlet 123*a* through which gas is introducible into space 124, gas outlet 128*a* through which the gas introduced into space 124 is dischargeable, and seal member 125 provided below space 124.

Therefore, in resin molding device 1 of the embodiment, by introducing gas into space 124 from gas inlet 123*a* and discharging the gas from gas outlet 128*a* after the resin molded product is manufactured, resin residue 127 that has been drawn into a place between first inner peripheral surface 111*a* of side surface member 111 and first outer peripheral surface 112*a* of bottom surface member 112 and accumulated in space 124 can be discharged from gas outlet 128*a* with the gas. As a result, resin molding device 1 of the embodiment can exhibit the following effects.

Firstly, when the resin molded product is manufactured, first inner peripheral surface 111*a* of side surface member 111 and first outer peripheral surface 112*a* of bottom surface member 112 slide. At this time, the resin drawn into a place between first inner peripheral surface 111*a* of side surface member 111 and first outer peripheral surface 112*a* of bottom surface member 112 falls into space 124. Therefore, the amount of resin that exists between those surfaces can be reduced. Therefore, the amount of wear of first mold 110 due to the sliding of first inner peripheral surface 111*a* of side surface member 111 and first outer peripheral surface 112*a* of bottom surface member 112 decreases. As a result, the lifespan of first mold 110 can be extended. Thus, the amount resin that returns to a place on first mold 110 can be reduced. Therefore, the amount of resin residue 127 that causes the uncleanliness of the mold and the amount that the resin that gets into the resin molded product can be reduced.

Secondly, the surface of second outer peripheral surface 112*b* of bottom surface member 112 exists below a surface at which first outer peripheral surface 112*a* of bottom surface member 112 and first inner peripheral surface 111*a* of side surface member 111 slide. Therefore, the possibility that resin residue 127 that has fallen by sliding stays on this surface and causes uncleanliness of resin molding device 1 (specifically, a portion on the lower side of first mold 110) can be reduced.

Thirdly, resin molding device 1 of the embodiment includes seal member 125 below space 124. Therefore, a case where resin residue 127 in space 124 further falls to a place below first mold 110 can be suppressed by seal member 125.

Fourthly, even when resin is drawn into a place between first inner peripheral surface 111*a* of side surface member 111 and first outer peripheral surface 112*a* of bottom surface member 112 by the sliding of first inner peripheral surface 111*a* of side surface member 111 and first outer peripheral surface 112*a* of bottom surface member 112 and resin residue 127 is accumulated in space 124, resin residue 127 can be removed from first mold 110 by introducing gas into space 124 from gas inlet 123*a* and discharging the gas from gas outlet 128*a* with resin residue 127. As a result, the number of times first mold 110 is disassembled and first mold 110 is cleaned can be significantly reduced.

Resin molding device 1 of the embodiment exhibits effects described below by including conditions described below.

When resin molding device 1 of the embodiment includes the resin residue collecting portion on the outer side of gas outlet 128*a* in outer peripheral surface 311 of side surface member 111, it becomes possible to collect resin residue 127 between first inner peripheral surface 111*a* of side surface member 111 and first outer peripheral surface 112*a* of bottom surface member 112 by the resin residue collecting portion. Therefore, resin molding device 1 of the embodiment can discard resin residue 127 without scattering resin residue 127 to the outside of compression molding die 10, and hence can suppress a case where resin residue 127 gets mixed into the resin molded product.

When gas is introduced into space 124 from gas inlet 123*a* after gas outlet 128*a* is closed at the time of releasing the resin molded product manufactured by using resin molding device 1 of the embodiment from first mold 100, the gas introduced into space 124 from gas inlet 123*a* may flow into a place between first inner peripheral surface 111*a* of side surface member 111 and first outer peripheral surface 112*a* of bottom surface member 112 and act as an assisting force when the resin molded product is released upward from first mold 100. As a result, an effect of facilitating the releasing of the resin molded product from first mold 100 can be expected.

Figure 13:
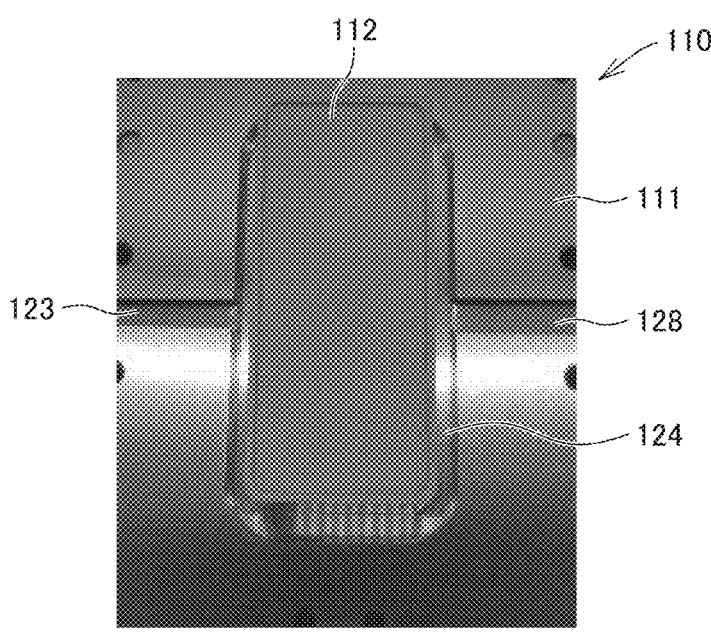
FIG. 13 is an enlarged photograph of the first mold before the manufacturing of the resin molded product of the resin molding device of the embodiment having the configuration shown in FIG. 2.

FIG. 13 shows an enlarged photograph of first mold 110 before the manufacturing of the resin molded product of resin molding device 1 of the embodiment having the configuration shown in FIG. 2. As shown in FIG. 13, a resin residue does not exist at all in space 124 of first mold 110 before the manufacturing of the resin molded product of resin molding device 1.

Figure 14:
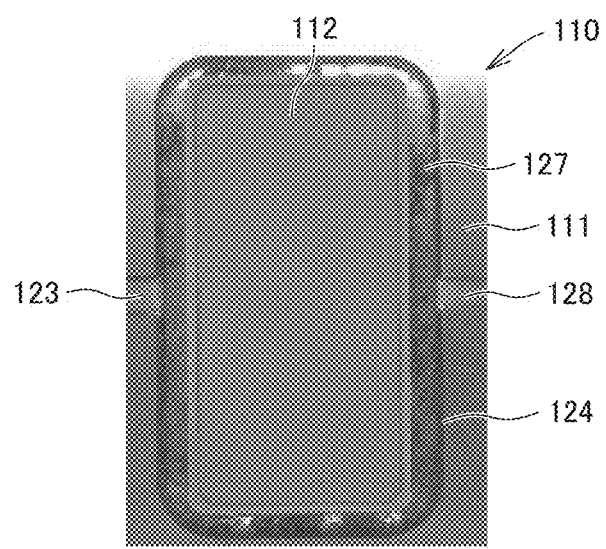
FIG. 14 is an enlarged photograph of the first mold after 70 cycles of resin molding are performed with use of the resin molding device of the related art.
Figure 15:
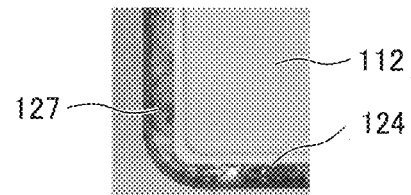
FIG. 15 is an enlarged photograph of a part of the first mold shown in FIG. 14.

FIG. 14 shows an enlarged photograph of first mold 110 after 70 cycles of resin molding are performed with use of the resin molding device of the related art. FIG. 15 shows an enlarged photograph of a part of first mold 110 shown in FIG. 14. As shown in FIG. 14 and FIG. 15, it has been found that a large amount of resin residue 127 exists in space 124 of first mold 110 after the manufacturing of the resin molded product of the resin molding device of the related art.

Figure 16:
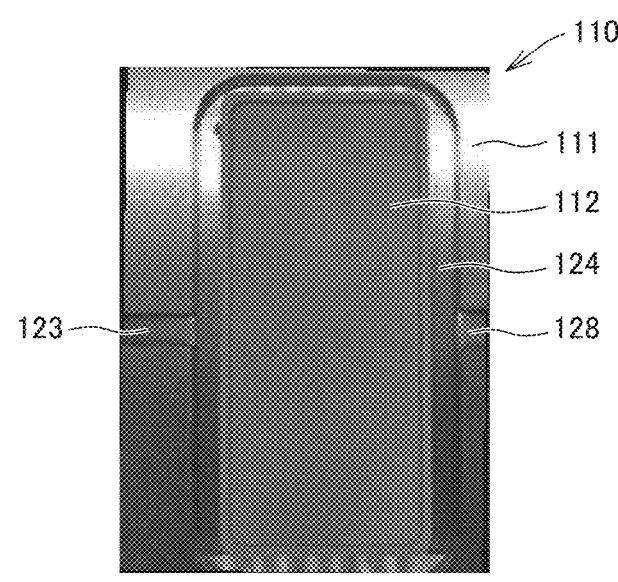
FIG. 16 is an enlarged photograph of the first mold after 70 cycles of resin molding are performed with use of the resin molding device of the embodiment.
Figure 17:
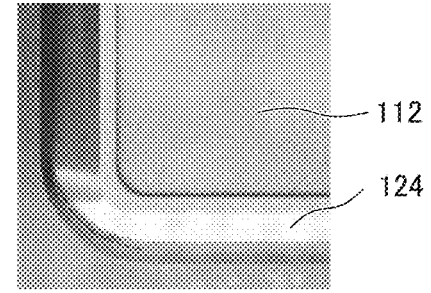
FIG. 17 is an enlarged photograph of a part of the first mold shown in FIG. 16.

FIG. 16 shows an enlarged photograph of first mold 110 after 70 cycles of resin molding are performed with use of resin molding device 1 of the embodiment. FIG. 17 shows an enlarged photograph of a part of first mold 110 shown in FIG. 16. As shown in FIG. 16 and FIG. 17, it has been found that resin residue 127 that has existed in space 124 of first mold 110 after the resin molding of resin molding device 1 is entirely removed from space 124 by introducing the compressed gas from the gas inlet.

Figure 18:
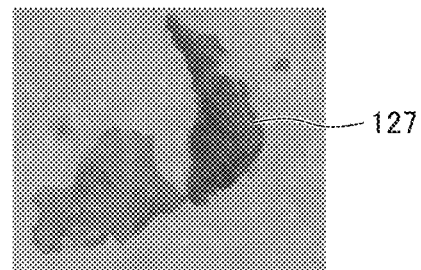
FIG. 18 is an enlarged photograph of the inside of a dust filter serving as a resin residue collecting portion provided on the outer side of a gas outlet in an outer peripheral surface of a side surface member of the first mold shown in FIG. 16 and FIG. 17.

FIG. 18 shows an enlarged photograph of the inside of the dust filter serving as the resin residue collecting portion provided on the outer side of the gas outlet in the outer peripheral surface of side surface member 111 of first mold 110 shown in FIG. 16 and FIG. 17 after the introduction of compressed gas described above. As shown in FIG. 18, the existence of resin residue 127 discharged from the gas outlet has been found on the inside of the dust filter.

Figure 19:
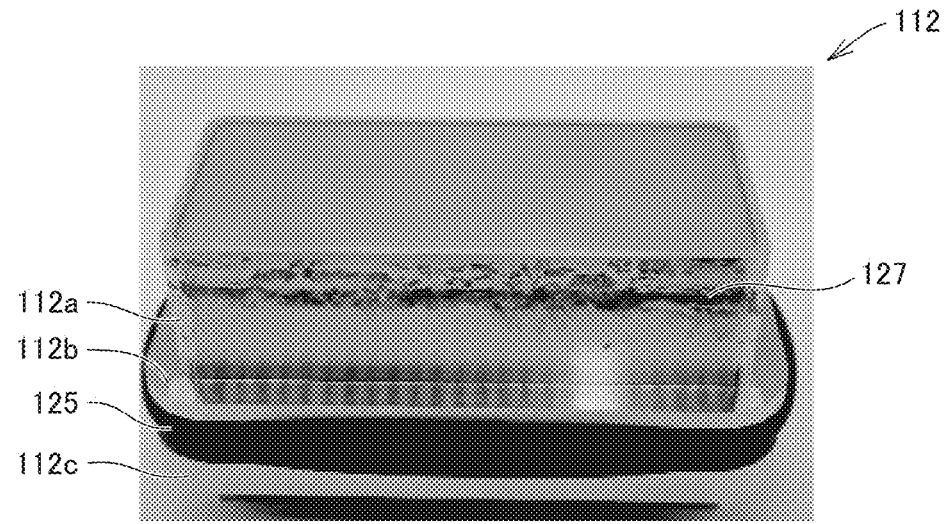
FIG. 19 is a photograph of the first mold shown in FIG. 16 and FIG. 17.
Figure 20:
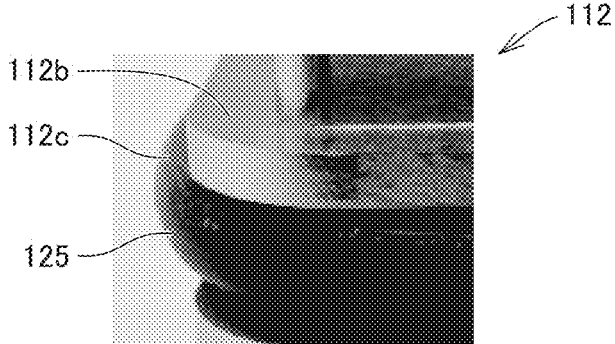
FIG. 20 is an enlarged photograph of a bottom surface member in a lower portion of the first mold shown in FIG. 19.

FIG. 19 shows a photograph of bottom surface member 112 of first mold 110 shown in FIG. 16 and FIG. 17. FIG. 20 shows an enlarged photograph of bottom surface member 112 in a lower portion of first mold 110 shown in FIG. 19.

As shown in FIG. 19, resin residue 127 is adhering to a sliding portion (a portion above first outer peripheral surface 112a) of bottom surface member 112 of first mold 110 with respect to side surface member 111, but resin residue 127 has not been found on second outer peripheral surface 112b and third outer peripheral surface 112c of first mold 110 as shown in FIG. 20. As a result of removing first mold 110 from resin sealing device 1 after performing 70 cycles of resin molding with use of resin molding device 1 of the embodiment and visually checking a portion on the lower side of first mold 110, resin residue 127 has not been found. This indicates that the falling of resin residue 127 from space 124 to a place that is even lower has been able to be prevented by seal member 125 of first mold 110 of resin molding device 1 of the embodiment.

Figure 21:
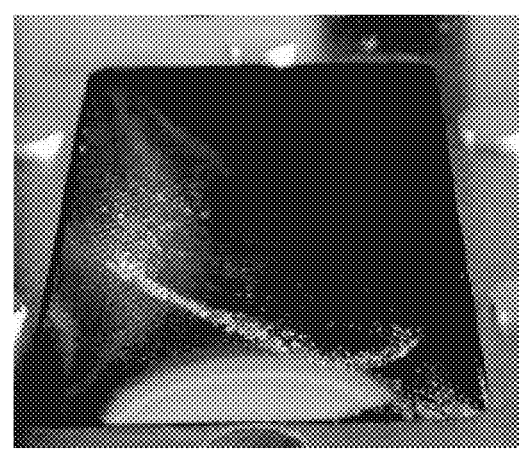
FIG. 21 is a photograph of the resin molded product immediately after being manufactured with use of the resin molding device of the embodiment.
Figure 22:
FIG. 22 is a photograph of the resin molded product after compressed gas is introduced from a gas inlet for about one minute in a state in which the gas outlet of the resin molding device is closed after the manufacturing of the resin molded product shown in FIG. 21.

FIG. 21 shows a photograph of the resin molded product immediately after being manufactured with use of resin molding device 1 of the embodiment. FIG. 22 shows a photograph of the resin molded product after compressed gas is introduced from the gas inlet for about one minute in a state in which the gas outlet of resin molding device 1 is closed after the manufacturing of the resin molded product shown in FIG. 21. By comparing FIG. 21 and FIG. 22 with each other, it has been found that the resin molded product floats up by introducing compressed gas from the gas inlet after the gas outlet is closed. This indicates that there is a possibility that the introduction of gas from the gas inlet after the closing of the gas outlet can assist the releasing of the resin molded product from first mold 110.

In the above, space 124 is formed by both of first step 230a in outer peripheral surface 212 of bottom surface member 112 and second step 230b in inner peripheral surface 211 of side surface member 111, but the method for forming space 124 in the present embodiment is not limited to the above. For example, it is possible to form space 124 by only first step 230a in bottom surface member 112 or form space 124 by only second step 230b in side surface member 111.

Figure 23:
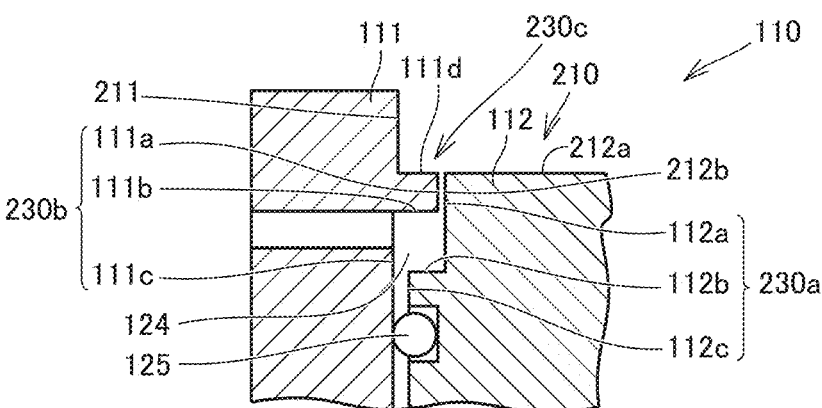
FIG. 23 is a schematic enlarged cross-sectional view of a first mold of a resin molding device of another embodiment.

Compression molding die 10 is not limited to compression molding die 10 of resin molding device 1 of the embodiment described above as long as first mold 110 that configures cavity 210 has a sliding portion. For example, as shown in a schematic enlarged cross-sectional view of FIG. 23, side surface member 111 may include a third step 230c formed by inner peripheral surface 211, a surface 111d, and first inner peripheral surface 111a configuring cavity 210 on the side of bottom surface member 112. In this case, a bottom surface of cavity 210 can be formed by upper surface 212a of bottom surface member 112 and surface 111d of side surface member 111.

The embodiments have been described as above, but it is planned from the beginning to combine the embodiments described above with each other, as appropriate.

It is to be understood that the embodiments disclosed above are merely examples in all aspects and in no way intended to limit the invention. The scope of the present invention is not limited to the description above, and is defined by the scope of claims. All modifications made within the scope and spirit equivalent to those of the claims are intended to be included in the invention.

INDUSTRIAL APPLICABILITY

According to the embodiment disclosed herein, it is possible to provide a compression molding die, a resin molding device, a resin molding system, and a method for manufacturing a resin molded product.

REFERENCE SIGNS LIST

1 resin molding device; 10 compression molding die; 110, 1100 first mold; 120 second mold; 111, 1111 side surface member; 111a first inner peripheral surface; 111b second inner peripheral surface; 111c third inner peripheral surface; 111d surface; 112 bottom surface member; 112a first outer peripheral surface; 112b second outer peripheral surface; 112c third outer peripheral surface; 114 elastic member; 115 movable platen; 116 supporting portion; 117 first driving mechanism; 118 second driving mechanism; 121 upper stationary platen; 122 lower stationary platen; 123 gas introducing passage; 123a gas inlet; 124 space; 125 seal member; 126 arrow; 127 resin residue; 128 gas discharging passage; 128a gas outlet; 130 step; 201 molding target; 202 resin material; 202a molten resin; 202b cured resin; 202c resin; 210 cavity; 211; 1111a inner peripheral surface; 212a upper surface; 212b, 311 outer peripheral surface; 230a first step; 230b second step; 230c third step; 300 resin molded product; 1000 resin molding system; 1001 resin supplying module; 1002 resin molding module; 1003 supplying/housing module; 1004 control unit; 1112b sliding surface.

The invention claimed is:

1. A compression molding die, comprising:
   a first mold; and
   a second mold disposed above the first mold to face the first mold, wherein:
      the first mold includes a bottom surface member and a side surface member;

the bottom surface member includes an upper surface on which a resin material can be disposed, and an outer peripheral surface that extends downward from the upper surface;

the side surface member includes an inner peripheral surface that surrounds the outer peripheral surface of the bottom surface member;

a cavity of the first mold is formed by at least the upper surface of the bottom surface member and the inner peripheral surface of the side surface member;

a space is providable in the first mold by a step in at least one of the outer peripheral surface of the bottom surface member and the inner peripheral surface of the side surface member;

the first mold further includes a gas inlet through which gas is introducible into the space, a gas outlet through which the gas introduced into the space is dischargeable, and a seal member below the space;

the step includes a first step in the outer peripheral surface of the bottom surface member, and a second step in the inner peripheral surface of the side surface member, the second step disposed adjacent to and separate from the first step;

the first step includes a first outer peripheral surface that extends downward from the upper surface of the bottom surface member, a second outer peripheral surface that extends from the first outer peripheral surface to an outer side, and a third outer peripheral surface that extends downward from the second outer peripheral surface; and the space is formed by both of the first step in the outer peripheral surface of the bottom surface member and the second step in the inner peripheral surface of the side surface member.

2. The compression molding die according to claim 1, wherein the space is provided below the cavity.

3. The compression molding die according to claim 1, wherein:

the second step includes a first inner peripheral surface capable of sliding with the first outer peripheral surface of the bottom surface member, a second inner peripheral surface that extends from the first inner peripheral surface to the outer side, and a third inner peripheral surface that extends downward from the second inner peripheral surface.

4. The compression molding die according to claim 3, wherein the space is surrounded by the first outer peripheral surface and the second outer peripheral surface of the bottom surface member, and the second inner peripheral surface and the third inner peripheral surface of the side surface member.

5. The compression molding die according to claim 3, wherein a width of the space is wider than a width between the first outer peripheral surface of the bottom surface member and the first inner peripheral surface of the side surface member.

6. The compression molding die according to claim 1, wherein at least one of the gas inlet and the gas outlet is provided in an outer peripheral surface of the side surface member.

7. A resin molding device, comprising the compression molding die according to claim 1.

8. A resin molding system, comprising the resin molding device according to claim 7.

9. A method for manufacturing a resin molded product using the compression molding die according to claim 1, the method comprising:

installing a molding target into the second mold;

supplying a resin material into the cavity;

manufacturing a resin molded product by resin-molding the molding target with use of the resin material; and introducing gas into the space from the gas inlet and discharging the gas from the gas outlet.

10. The method for manufacturing a resin molded product according to claim 9, further comprising:

closing the gas outlet; and releasing the resin molded product from the first mold while introducing gas into the space from the gas inlet after the closing the gas outlet.

11. A method for manufacturing a resin molded product, the method comprising preparing a compression molding die including:

a first mold; and a second mold disposed above the first mold to face the first mold, wherein:

the first mold includes a bottom surface member, a side surface member, a cavity formed by the bottom surface member and the side surface member, a space below the cavity, a gas inlet through which gas is introducible into the space, and a gas outlet through which the gas introduced into the space is dischargeable;

the method for manufacturing a resin molded product further includes:

installing a molding target into the second mold;

supplying a resin material into the cavity;

moving the first mold toward the second mold;

manufacturing a resin molded product by resin-molding the molding target with use of the resin material; and introducing gas into the space from the gas inlet and discharging the gas from the gas outlet;

the manufacturing the resin molded product includes moving the bottom surface member toward the second mold; and the moving the bottom surface member includes moving the bottom surface member while reducing a volume of the space.

12. The method for manufacturing a resin molded product according to claim 11, further comprising:

closing the gas outlet; and releasing the resin molded product from the first mold while introducing gas into the space from the gas inlet after the closing the gas outlet.

* * * * *